United States Patent
Janssen et al.

(10) Patent No.: US 12,055,072 B2
(45) Date of Patent: Aug. 6, 2024

(54) METHOD FOR MODIFYING A SINGLE SHAFT COMBINED CYCLE POWER PLANT

(71) Applicant: Siemens Energy Global GmbH & Co. KG, Bayern (DE)

(72) Inventors: Stefan Janssen, Essen (DE); Michael Kursch, Mülheim an der Ruhr (DE); Till Spielmann, Mülheim an der Ruhr (DE); Johann Stach, Mülheim an der Ruhr (DE); Oliver Tobias Walk, Essen (DE); Kai Wöstmann, Haltern am See (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 61 days.

(21) Appl. No.: 17/796,662

(22) PCT Filed: Mar. 23, 2020

(86) PCT No.: PCT/EP2020/057950
§ 371 (c)(1),
(2) Date: Jul. 31, 2022

(87) PCT Pub. No.: WO2021/155962
PCT Pub. Date: Aug. 12, 2021

(65) Prior Publication Data
US 2023/0058708 A1    Feb. 23, 2023

(30) Foreign Application Priority Data
Feb. 6, 2020   (EP) .................... 20155823

(51) Int. Cl.
*F01K 23/16*   (2006.01)
*F01D 25/16*   (2006.01)
(Continued)

(52) U.S. Cl.
CPC ............ *F01K 23/16* (2013.01); *F01D 25/162* (2013.01); *F01D 25/28* (2013.01); *F02C 7/06* (2013.01);
(Continued)

(58) Field of Classification Search
CPC ........ F01K 23/16; F01D 25/162; F01D 25/28; F02C 7/06; F02C 7/20; F16C 17/04;
(Continued)

(56) References Cited

U.S. PATENT DOCUMENTS

| | | |
|---|---|---|
| 5,330,320 A | 7/1994 | Mansson |
| 5,447,025 A | 9/1995 | Rousselle |

(Continued)

FOREIGN PATENT DOCUMENTS

| | | |
|---|---|---|
| EP | 0601825 A1 | 6/1994 |
| EP | 1131537 B1 | 10/2004 |

(Continued)

OTHER PUBLICATIONS

PCT International Search Report and Written Opinion of International Searching Authority mailed Aug. 31, 2020 corresponding to PCT International Application No. PCT/EP2020/057950 filed Mar. 23, 2020.

*Primary Examiner* — Steven M Sutherland
(74) *Attorney, Agent, or Firm* — Wolter Van Dyke Davis, PLLC

(57) ABSTRACT

A method for modifying an existing single shaft combined cycle power plant having a steam turbine part and a gas turbine part which are connected to each other rigidly by an intermediate shaft. The gas turbine part is supported by two pin-ended supports allowing a certain axial displacement of the casing by rotating about corresponding axes. The old gas turbine part is replaced by a new gas turbine part having a different structure, namely a rigid support and a flexible (Continued)

support. Relative thermal expansion or displacement of the intermediate shaft is compensated by a hydraulic unit comprising a double-acting piston for displacing the gas turbine rotor with respect to the gas turbine stator. The hydraulic unit is controlled based on a displacement measurement in the steam turbine.

5 Claims, 4 Drawing Sheets

(51) Int. Cl.
    *F01D 25/28*     (2006.01)
    *F02C 7/06*     (2006.01)
    *F02C 7/20*     (2006.01)
    *F16C 17/04*     (2006.01)
    *F16C 25/02*     (2006.01)
    *F16C 35/02*     (2006.01)

(52) U.S. Cl.
    CPC ............... *F02C 7/20* (2013.01); *F16C 17/04* (2013.01); *F16C 25/02* (2013.01); *F16C 35/02* (2013.01); *F05D 2230/80* (2013.01); *F05D 2240/52* (2013.01); *F16C 2360/23* (2013.01)

(58) Field of Classification Search
    CPC ...... F16C 25/02; F16C 35/02; F16C 2360/23; F05D 2230/80; F05D 2240/52
    See application file for complete search history.

(56) References Cited

U.S. PATENT DOCUMENTS

| 2002/0009361 | A1 | 1/2002 | Reichert et al. |
| 2019/0195081 | A1* | 6/2019 | Kim ........................ F16C 17/04 |

FOREIGN PATENT DOCUMENTS

| JP | H0868302 | A | 3/1996 |
| JP | 4481523 | B2 | 6/2010 |

* cited by examiner

METHOD FOR MODIFYING A SINGLE SHAFT COMBINED CYCLE POWER PLANT

CROSS REFERENCE TO RELATED APPLICATIONS

This application is the US National Stage of International Application No. PCT/EP2020/057950 filed 23 Mar. 2020, and claims the benefit thereof. The International Application claims the benefit of European Application No. EP20155823 filed 6 Feb. 2020. All of the applications are incorporated by reference herein in their entirety.

FIELD OF INVENTION

The present invention relates to a method for modifying a single shaft combined cycle power plant comprising a gas turbine part having a gas turbine stator and a gas turbine rotor supported by a thrust bearing and a loose bearing, a steam turbine part having at least one steam turbine stator and a steam turbine rotor supported by two loose bearings, and an intermediate shaft, which is rigidly connected to the gas turbine rotor and to the steam turbine rotor forming a rigid single shaft configuration, wherein the gas turbine stator is arranged on at least two pin-ended supports positioned at the cold side and on at least two pin-ended supports positioned at the hot side of the gas turbine part, and wherein several tie-rods are provided, whose first ends are connected to the gas turbine stator and whose second ends are held stationary with respect to the steam turbine stator.

BACKGROUND OF INVENTION

During the operation of such a combined cycle power plant the intermediate shaft undergoes a thermal expansion, which leads to an axial displacement of the steam turbine rotor within the at least one steam turbine stator as well as to an axial displacement of the gas turbine rotor within the gas turbine stator due to the rigid single shaft arrangement. The pin-ended supports of the gas turbine part in combination with the tie rods at least partly compensate these axial displacements of the rotors relative to their stators. The pin ended supports allow an axial shift of the gas turbine stator in a pendulum fashion. The tie rods, which expand similar compared to the intermediate shaft, initiate said axial movement. This compensation is required to keep axial clearances of both turbines in acceptable limits and to avoid damages in case of exceeding these limits.

If only the gas turbine part of such a combined gas and steam turbine arrangement shall be replaced in order to modify the plant, a new gas turbine part is chosen having a very similar design compared to the design of the old gas turbine part, i.e. a new gas turbine part also comprising pin-ended supports as well as tie rods, in order to avoid problems with the interaction of the new gas turbine part with the old steam turbine part. This often urges companies operating such combined gas and steam turbine arrangements to continue the cooperation with the manufacturer of the original gas turbine part in absence of suitable alternatives.

SUMMARY OF INVENTION

Starting from this prior art it is an object of the present invention to provide an alternative method for modifying a combined cycle power plant of the above-mentioned type, whose gas turbine part is to be replaced.

In order to solve this object the present invention provides a method for modifying a single shaft combined cycle power plant comprising a gas turbine part having a gas turbine stator and a gas turbine rotor supported by a thrust bearing and a loose bearing, a steam turbine part having at least one steam turbine stator and a steam turbine rotor supported by two loose bearings, and an intermediate shaft, which is rigidly connected to the gas turbine rotor and to the steam turbine rotor forming a rigid single shaft configuration, wherein the gas turbine stator is arranged on at least two pin-ended supports positioned at the cold side and on at least two pin-ended supports positioned at the hot side of the gas turbine, and wherein several tie-rods are provided, whose first ends are connected to the gas turbine stator and whose second ends are held stationary with respect to the steam turbine stator, the method comprising the steps of removing the gas turbine part, the pin-ended supports an the tie rods, arranging at least one measuring device at the steam turbine part designed for measuring a physical dimension representing an axial displacement of the steam turbine rotor with respect to the at least one steam turbine stator caused by a thermal expansion of the intermediate shaft, providing a new gas turbine part having a gas turbine stator, a gas turbine rotor supported by a thrust bearing and by a loose bearing, a hydraulic unit acting on the thrust bearing and a controller designed for controlling the hydraulic unit on the basis of data provided by the at least one measuring device, wherein the thrust bearing and the hydraulic unit are designed in such a manner that the axial position of the gas turbine rotor relative to the gas turbine stator can be steplessly shifted by means of the hydraulic unit within a predetermined range, arranging the new gas turbine part on fixed supports positioned at its cold side and on flexible supports positioned at its hot side, and rigidly connecting the gas turbine rotor to the intermediate shaft.

Thus, the present invention proposes for cases, where an existing gas turbine part of a single shaft configuration, whose gas turbine stator is supported by pin-ended supports and comprises tie rods for compensating the thermally expanding intermediate shaft, needs to be replaced, to replace it by a new gas turbine part carried by fixed and flexible supports, wherein this new gas turbine part shall comprise a thrust bearing, i.e. an axial bearing, enabling an axial stepless displacement of the gas turbine rotor relative to the gas turbine stator to compensate the thermal expansion of the intermediate shaft. Further, a controller, a hydraulic unit and a measuring device are provided in order to change the position of the gas turbine rotor relative to the gas turbine stator depending on an axial displacement of the steam turbine rotor within the steam turbine stator. Hence, during the operation of such single shaft combined cycle power plant, the axial position of the gas turbine rotor is controlled in dependency of the axial displacement of the steam turbine rotor, i.e. in dependency of another engine.

According to one aspect of the present invention the physical dimension is the width of an axial gap and/or the width of a radial gap between the steam turbine rotor and the steam turbine stator.

Moreover, the present invention provides a method for operating a single shaft combined cycle power plant comprising a gas turbine part having a gas turbine stator and a gas turbine rotor, a steam turbine part having at least one steam turbine stator and a steam turbine rotor, and an intermediate shaft, which is rigidly connected to the gas turbine rotor and to the steam turbine rotor forming a rigid single shaft configuration, the method comprising the step of controlling the axial position of the gas turbine rotor relative to the gas turbine stator depending on a change of the axial position of the steam turbine rotor relative to the steam turbine stator.

According to one aspect of the present invention the width of an axial and/or of a radial gap between the steam turbine rotor and the steam turbine stator is monitored and, when a change of width is registered, the gas turbine rotor is steplessly moved in an axial direction relative to the gas turbine stator in order to compensate the movement of the steam turbine rotor.

Advantageously, the gas turbine rotor is hydraulically moved.

Further features and advantages of the present invention will become apparent by means of the following description of an embodiment of the present invention with reference to the accompanying drawing.

DETAILED DESCRIPTION OF INVENTION

Figure 1:
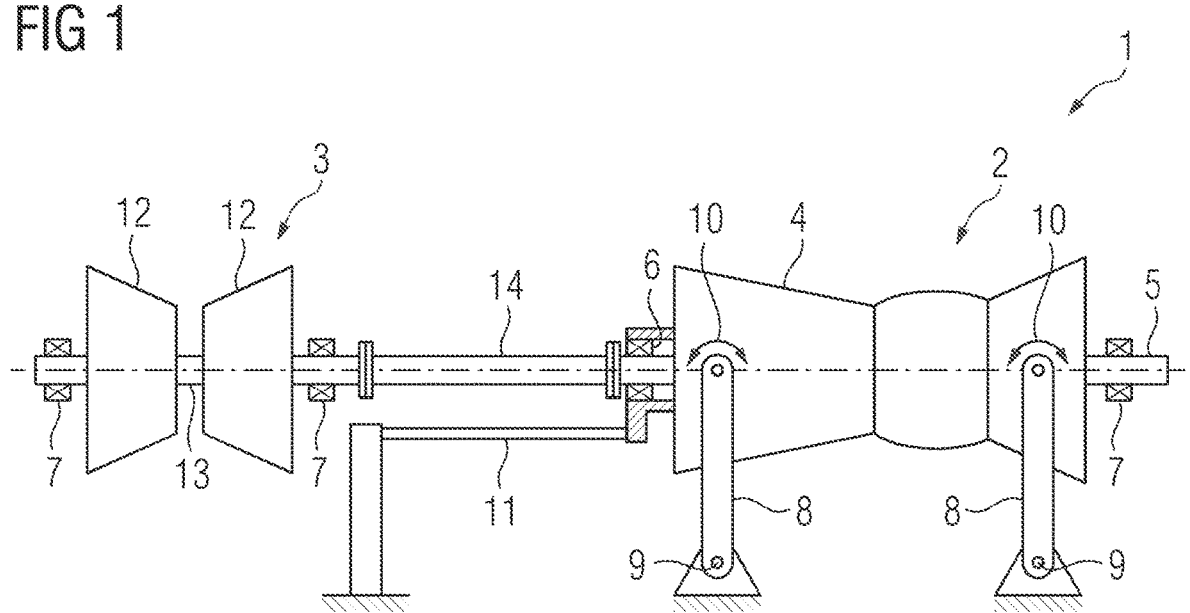
FIG. 1 is a schematically view of a part of a single shaft combined cycle power plant, whose gas turbine part needs to be replaced.
Figure 2:
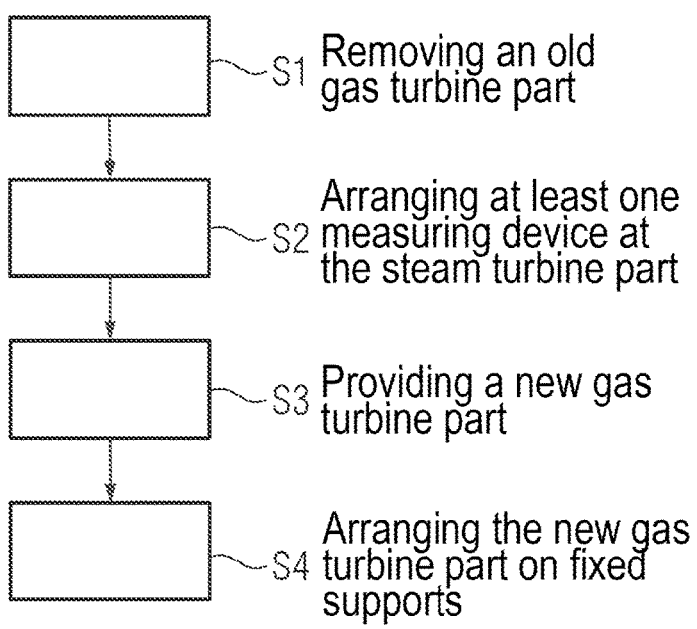
FIG. 2 is a flow chart showing steps of a method according to an embodiment of the present invention.

In the following same reference numerals denote same or similar components.

FIG. 1 shows a single shaft combined cycle power plant 1 comprising a gas turbine part 2 and a steam turbine part 3.

The gas turbine part 2 has a gas turbine stator 4 and a gas turbine rotor 5 supported by a thrust bearing 6 and a loose bearing 7. The gas turbine stator 4 is arranged on two pin-ended supports 8 positioned oppositely at the cold side and on two pin-ended supports 8 positioned oppositely at the hot side of the gas turbine part 2. Accordingly, the gas turbine stator 4 can be tilted around axes 9 in direction of arrows 10 thus enabling a movement of the gas turbine stator 4 in the axial direction A. Moreover, several tie-rods 11 (only one of them is shown in FIG. 1) are provided, whose first ends are connected to the gas turbine stator 4 and whose second ends are held stationary.

The steam turbine part 3 has two steam turbine stators 12 each being arranged on fixed supports (not shown) and a steam turbine rotor 13 supported by two loose bearings 7.

Moreover, the power plant 1 comprises an intermediate shaft 14, which is rigidly connected to the gas turbine rotor 5 and to the steam turbine rotor 13 forming a rigid single shaft configuration.

During the operation of the combined cycle power plant 1 the intermediate shaft 14 undergoes a thermal expansion, which leads to an axial displacement of the steam turbine rotor 13 within the steam turbine stators 12 as well as to an axial displacement of the gas turbine rotor 5 within the gas turbine stator 4 due to the rigid single shaft arrangement. The pin-ended supports 8 of the gas turbine part 2 in combination with the tie rods 11 at least partly compensate these axial displacements of the rotors 5, 13 relative to their stators 4, 12. The pin ended supports 8, as already stated above, allow an axial shift of the gas turbine stator 4 in a pendulum fashion. The tie rods 11, which expand similar compared to the intermediate shaft 14, initiate said axial movement. This compensation is required to keep axial clearances of both turbines in acceptable limits and to avoid damages in case of exceeding these limits.

If the gas turbine part 2 of the power plant 1 needs to be replaced by a new gas turbine part 2 in order to modify the power plant 1, the following steps are performed according to a method according to an embodiment of the present invention.

In a first step S1, the old gas turbine part 2, the pin-ended supports 8 and the tie rods 11 are removed.

Moreover, in step S2 at least one measuring device 15 is arranged at the steam turbine part 3. Said measuring 15 device is designed for measuring a physical dimension representing an axial displacement of the steam turbine rotor 13 with respect to at least one of the steam turbine stators 12. In the present case, the physical dimension is the width a of an axial gap between the steam turbine rotor 13 and the steam turbine stator 12. However, the monitoring of other physical dimensions is possible, such as the width of a radial gap between the steam turbine rotor 13 and the steam turbine stator 12. It is also possible to arrange several measuring devices 15 to monitor one or several different physical dimension(s) in order to provide redundant measuring devices 15.

In step S3 a new gas turbine part 2 is provided having a gas turbine stator 4, a gas turbine rotor 5 supported by a thrust bearing 16 and by a loose bearing 7, a hydraulic unit 17 acting on the thrust bearing 16 and a controller 18 designed for controlling the hydraulic unit 17 on the basis of data provided by the measuring devices 15. The thrust bearing 16 and the hydraulic unit 17 are designed in such a manner that the axial position of the gas turbine rotor 5 relative to the gas turbine stator 4 can be steples sly shifted by means of the hydraulic unit 17 within a predetermined range.

Thereafter, in step S4 the new gas turbine part 2 is arranged on fixed supports 19 positioned oppositely at its cold side and on flexible supports 21 positioned oppositely at its hot side, the flexible supports 21 are able to compensate thermal expansions of the stators 4. Moreover, the gas turbine rotor 5 is rigidly connected to the intermediate shaft 14. The modified power plant 1 is shown in FIG. 3.

Figure 3:
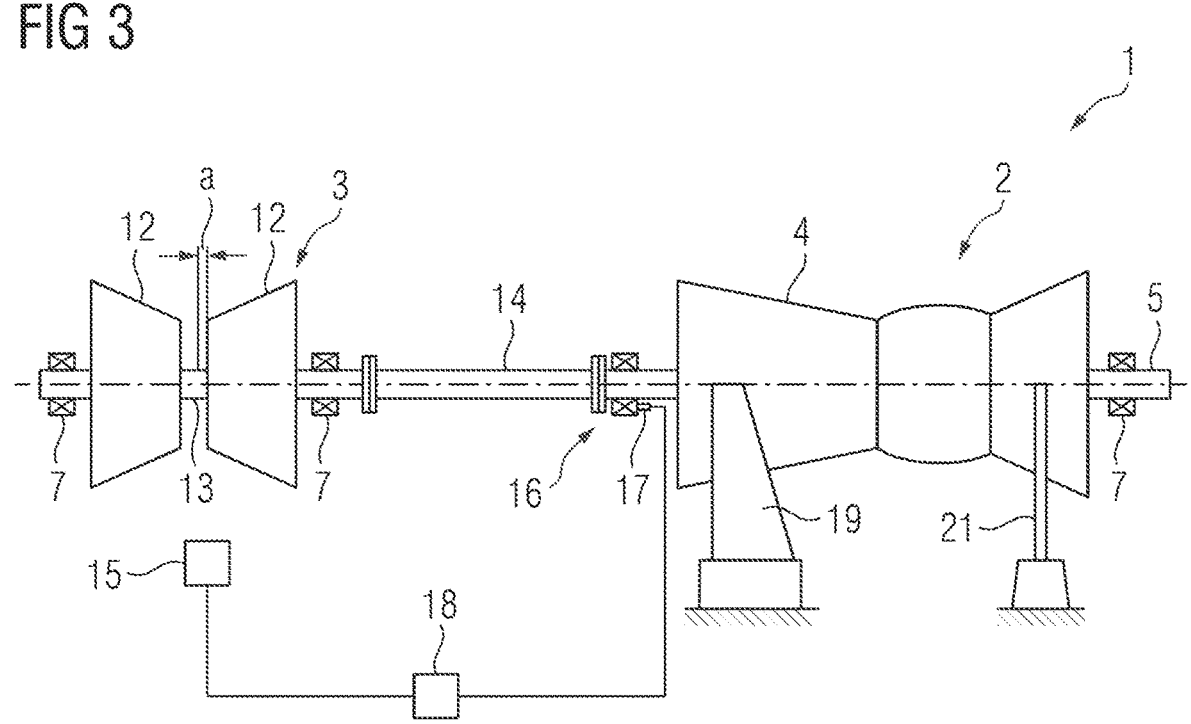
FIG. 3 is a schematically view of said part of the single shaft combined cycle power plant shown in FIG. 1, whose gas turbine part has been replaced within the scope of such method.

During the operation of the combined cycle power plant 1 shown in FIG. 3, the intermediate shaft 14 undergoes a thermal expansion, which leads to an axial displacement of the steam turbine rotor 13 within the steam turbine stators 12. This displacement is registered by the measuring device 15. In order to compensate such displacement, the controller 18 controls the hydraulic unit 17 on the basis of the data received from the measuring device 15, whereupon the hydraulic unit 17 acts on the thrust bearing 16 in order to initiate an axial compensation movement of the gas turbine rotor 5 relative to the gas turbine stator 4. This compensation keeps the axial clearances of both turbines in acceptable limits and avoids damages in case of exceeding these limits.

Figure 4:
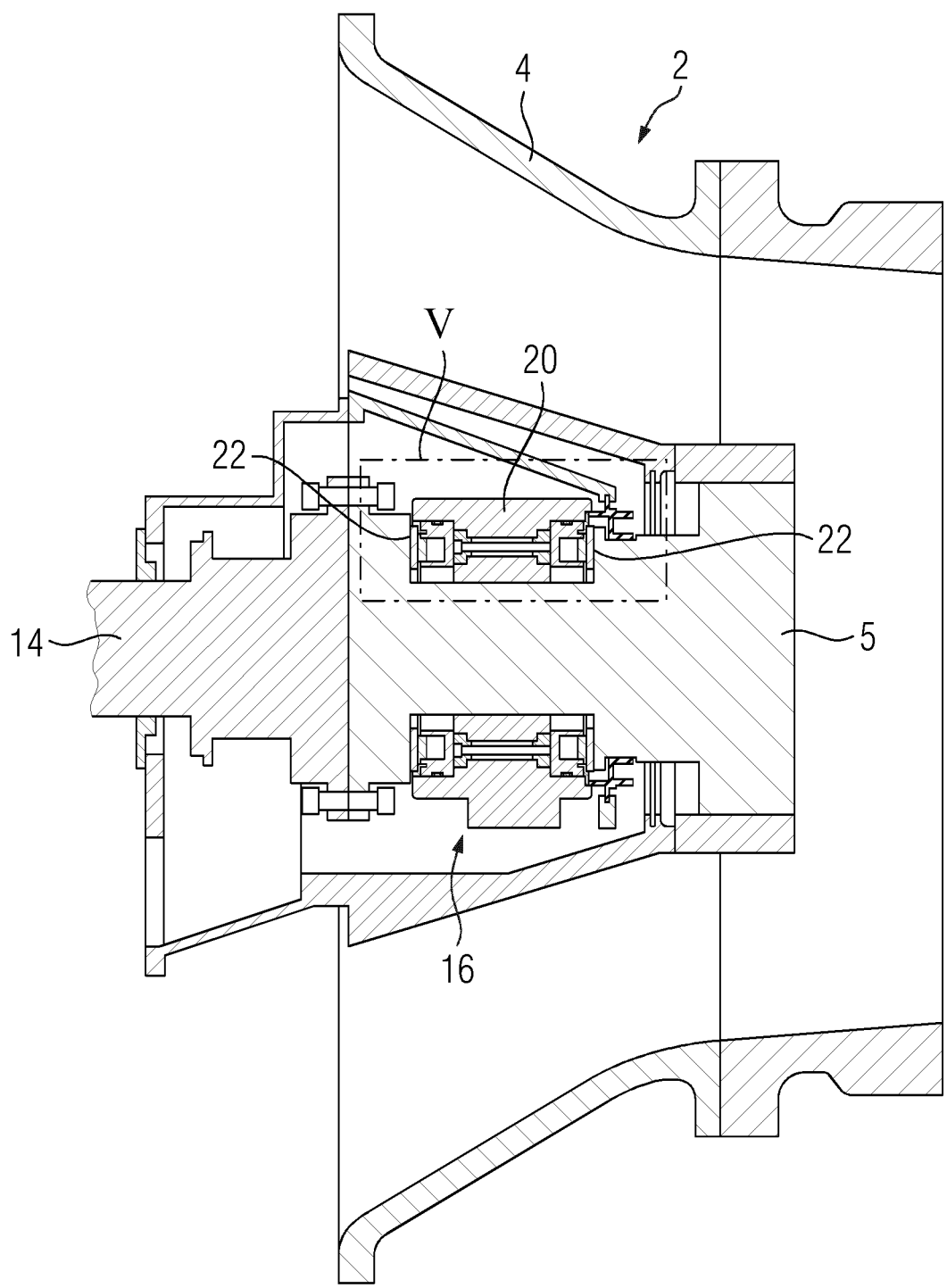
FIG. 4 is a cross sectional view of the cold side of the new gas turbine part and FIG. 5 an enlarged view of section V in FIG. 4.
Figure 5:
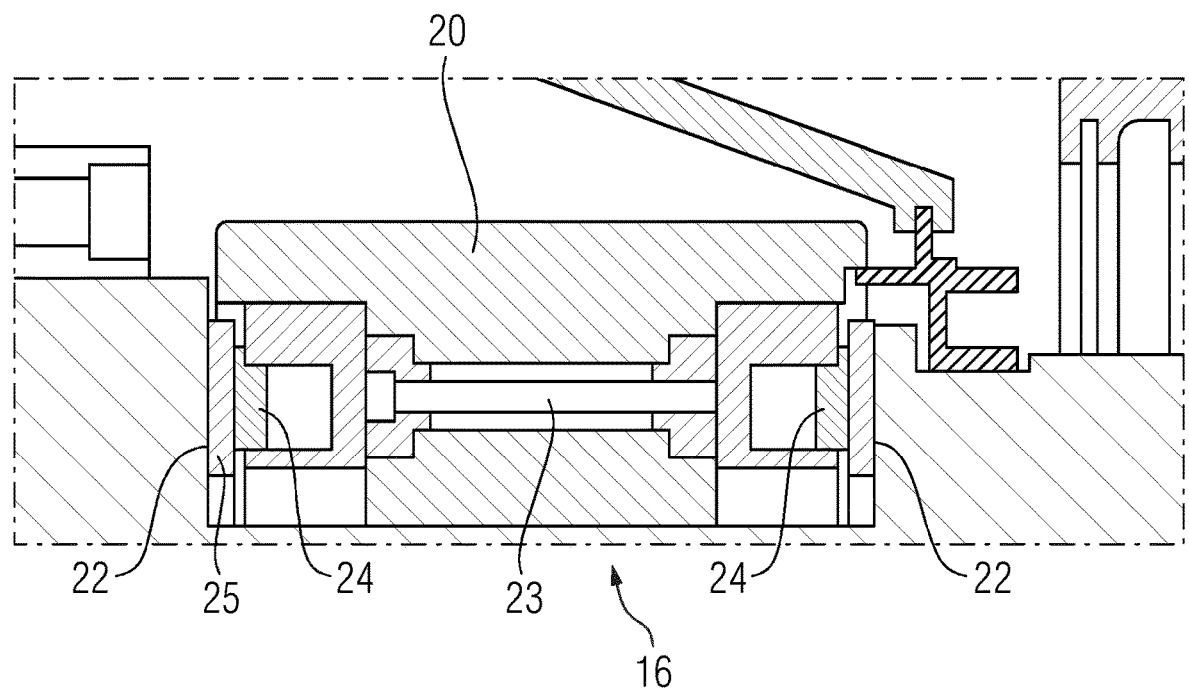

FIGS. 4 and 5 show a possible structure of the thrust bearing 16. The thrust bearing 16 comprises an outer ring 20, which is arranged stationary at the gas turbine stator 4, wherein such movement is initiated by a plurality of circumferentially arranged double action pistons 23 manipulated by the hydraulic unit 17. Each piston 23 is provided at each of its free ends with a thrust bearing 24, which can be pressed in axial direction against the rotor shoulder 22. By moving the pistons 23 in the one or the other direction, the gas turbine rotor 5 is axially moved relative to the gas turbine stator 4.

Although the present invention has been illustrated and described in greater detail with reference to the exemplary embodiment, the invention is not limited to the examples disclosed and further variations can be inferred by a person skilled in the art, without departing from the scope of protection of the invention.

The invention claimed is:

1. A method for modifying a single shaft combined cycle power plant comprising an existing gas turbine part comprising an existing gas turbine stator and an existing gas turbine rotor supported by an existing thrust bearing and an existing loose bearing, a steam turbine part having at least one steam turbine stator and a steam turbine rotor supported by two loose bearings, and an intermediate shaft, which is rigidly connected to the existing gas turbine rotor and to the steam turbine rotor forming a rigid single shaft configuration, wherein the existing gas turbine stator is arranged on at least two pin-ended supports positioned at a cold side and on at least two pin-ended supports positioned at a hot side of the existing gas turbine part, and wherein several tie-rods are provided, whose first ends are connected to the existing gas turbine stator and whose second ends are held stationary with respect to the at least one steam turbine stator, the method comprising:

removing the existing gas turbine part, the at least two pin-ended supports positioned at the cold side, the at least two pin-ended supports positioned at the hot side, and the several tie-rods, arranging at least one measuring device at the steam turbine part designed for measuring a physical dimension representing an axial displacement of the steam turbine rotor with respect to the at least one steam turbine stator caused by a thermal expansion of the intermediate shaft, providing a new gas turbine part having a gas turbine stator, a gas turbine rotor supported by a thrust bearing and by a loose bearing, a hydraulic unit acting on the thrust bearing and a controller designed for controlling the hydraulic unit on the basis of data provided by the at least one measuring device, wherein the thrust bearing and the hydraulic unit are designed in such a manner that an axial position of the gas turbine rotor relative to the gas turbine stator can be steplessly shifted by the hydraulic unit within a predetermined range, arranging the new gas turbine part on fixed supports positioned at its cold side and flexible supports positioned at its hot side, and rigidly connecting the gas turbine rotor to the intermediate shaft.

2. The method according to claim 1, wherein the physical dimension is a width of an axial gap and/or a width of a radial gap between the steam turbine rotor and the at least one steam turbine stator.

3. A method for operating a single shaft combined cycle power plant comprising a gas turbine part having a gas turbine stator and a gas turbine rotor, a steam turbine part having a steam turbine stator and a steam turbine rotor, and an intermediate shaft which is rigidly connected to the gas turbine rotor and to the steam turbine rotor forming a rigid single shaft configuration, the method comprising:

using a measuring device at the steam turbine part to measure a physical dimension between the steam turbine rotor and the steam turbine stator that represents an axial displacement of the steam turbine rotor with respect to the steam turbine stator caused by a thermal expansion of the intermediate shaft; and controlling an axial position of the gas turbine rotor relative to the gas turbine stator depending on the physical dimension.

4. The method according to claim 3, further comprising:

monitoring a width of an axial and/or a radial gap between the steam turbine rotor and the steam turbine stator with the measuring device, and steplessly moving the gas turbine rotor in an axial direction relative to the gas turbine stator in order to compensate movement of the steam turbine rotor when a change of the width is registered.

5. The method according to claim 4, wherein the gas turbine rotor is hydraulically moved, and wherein the gas turbine stator is arranged on fixed supports positioned at its cold side and flexible supports positioned at its hot side.

* * * * *